United States Patent
Dotsey et al.

(10) Patent No.: US 7,543,841 B2
(45) Date of Patent: Jun. 9, 2009

(54) CUP HOLDER FOR A STROLLER

(75) Inventors: Michael A. Dotsey, Pottstown, PA (US); Patrick Nolan, Royersford, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 11/696,165

(22) Filed: Apr. 3, 2007

(65) Prior Publication Data

US 2007/0235967 A1 Oct. 11, 2007

Related U.S. Application Data

(60) Provisional application No. 60/789,240, filed on Apr. 3, 2006.

(51) Int. Cl.
*B62B 9/00* (2006.01)

(52) U.S. Cl. .................. 280/647; 280/642; 280/650; 280/657; 280/658; 280/47.25; 280/47.28

(58) Field of Classification Search ................. 280/642, 280/647, 650, 657, 658, 47.25, 47.38; 296/37.4; 224/926; 248/311.2
See application file for complete search history.

(56) References Cited

U.S. PATENT DOCUMENTS

| | | | |
|---|---|---|---|
| 4,191,350 A | | 3/1980 | Ormond |
| 4,728,018 A | * | 3/1988 | Parker .................. 224/544 |
| 5,522,527 A | | 6/1996 | Tsai |
| 5,618,018 A | * | 4/1997 | Baniak .................. 248/311.2 |
| 5,709,400 A | | 1/1998 | Bonnier et al. |
| 5,845,888 A | * | 12/1998 | Anderson ............... 248/311.2 |
| 6,099,022 A | | 8/2000 | Pring |
| 6,193,263 B1 | | 2/2001 | Lin |
| 6,203,054 B1 | | 3/2001 | Matsumoto |
| 6,209,892 B1 | | 4/2001 | Schaaf et al. |

(Continued)

FOREIGN PATENT DOCUMENTS

GB 2 326 395 12/1998

(Continued)

OTHER PUBLICATIONS

Britax Preview Lightweight Umbrella Travel System (Jun. 2004).

(Continued)

*Primary Examiner*—Christopher P Ellis
*Assistant Examiner*—Katy Meyer
(74) *Attorney, Agent, or Firm*—Lempia Braidwood LLC (57) ABSTRACT

A cup holder assembly for a stroller has a slider that is carried on and slidable along a part of the stroller frame between a stowed position and a deployed position. A cup receiving ring is carried on the slider and is movable between a stowed orientation and a deployed orientation. A support arm is carried on the slider and is movable between a stowed orientation and a deployed orientation. Part of the support arm extends beneath the cup receiving ring in the respective deployed orientations. When the cup receiving ring and the support arm are in the respective stowed orientations and the slider is in the stowed position the cup holder assembly is housed within a space in the stroller frame.

18 Claims, 6 Drawing Sheets

U.S. PATENT DOCUMENTS

| | | |
|---|---|---|
| 6,398,233 B1 | 6/2002 | Liang et al. |
| 6,446,990 B1 | 9/2002 | Nania et al. |
| 2002/0070324 A1 | 6/2002 | Huang |
| 2004/0094935 A1* | 5/2004 | Fair et al. .................. 280/642 |
| 2005/0242548 A1 | 11/2005 | Hutchinson et al. |
| 2006/0001226 A1 | 1/2006 | Refsum |

FOREIGN PATENT DOCUMENTS

| | | | |
|---|---|---|---|
| GB | 2326395 A | * | 12/1998 |
| JP | 73 00073 | | 11/1995 |

OTHER PUBLICATIONS

International Search Report and Written Opinion issued in related International application No. PCT/US07/65898 mailed Sep. 6, 2007.

International Preliminary Report on Patentability issued in corresponding PCT application No. PCT/US2007/065898 mailed Jul. 16, 2008.

* cited by examiner

CUP HOLDER FOR A STROLLER

RELATED APPLICATION DATA

This patent is related to and claims priority benefit of U.S. Provisional Patent Application No. 60/789,240, which was filed on Apr. 3, 2006 and entitled "Stroller," and which is hereby incorporated by reference in its entirety

BACKGROUND OF THE INVENTION

1. Field of the Disclosure

The present disclosure is generally directed to strollers, and more particularly to a cup holder for a stroller that can be stowed and deployed on the stroller.

2. Description of Related Art

Strollers with cup holders for the parent or caregiver are known in the art. Cup holders for attachment to strollers for the caregiver's use are also known in the art. Existing cup holders on strollers typically sit on a portion of the frame or handle bar of the stroller during use. Very often, the cup holder is a fixed, immovable product on a parent or storage tray positioned near the handle of the stroller.

Aftermarket cup holders are available that are for use on a stroller. When the stroller is folded or collapsed, the aftermarket cup holder typically must be removed in order to fully collapse or fold the stroller. Aftermarket cup holders are typically not designed with a particular stroller or fold configuration in mind. Sometimes a stroller specific cup holder is provided on a tray that extends between two sides of the stroller frame. Many stroller frames do not collapse in a width-wise direction and are thus only two-dimensionally collapsible. Such a tray can typically stay attached to this type of stroller during folding. Unless the tray or cup holder is removed from the stroller, the cup holder is always in a deployed, ready for use position, even when not needed. If removed, the tray and cup holder can be easily lost or misplaced.

Some strollers are collapsible or foldable in three dimensions and thus can collapse in a width-wise direction. A tray extending between the frame sides on such a stroller either must be removed to fold the stroller or must be capable of collapsing width-wise across the stroller while folded. A foldable tray arrangement can add significant complexity and cost to the stroller. Having to remove the tray from the stroller, either in a two or a three dimensional folding apparatus, adds to the time and difficulty it takes one to collapse the structure.

On some strollers, the cup holder is positioned on a part of the stroller where it does not interfere with folding or collapsing of the stroller. In these instances the cup holder is often a product that projects outward of the collapsed stroller package. The cup holder is therefore either is susceptible to damage or increases the overall size of the collapsed stroller. Also, existing strollers typically do not allow a user to determine when a cup holder be deployed for use and when the cup holder need be hidden away, except in instances where the cup holder is completely removable. However, if such a cup holder must be removed, it can be lost or misplaced and not available the next time a caregiver wishes to deploy and use the cup holder.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The cup holder disclosed herein solves or improves upon one or more of the above noted and other problems and disadvantages with known cup holders for a stroller. The disclosed cup holder can collapse from a deployed, in-use configuration to a stowed configuration. The disclosed cup holder can also be hidden within a structure of the stroller when not in use and that can be deployed for use when needed. These and other objects, features, and advantages of the present invention will become apparent upon a review of the attached drawing figures and the detailed description below.

Figure 1:
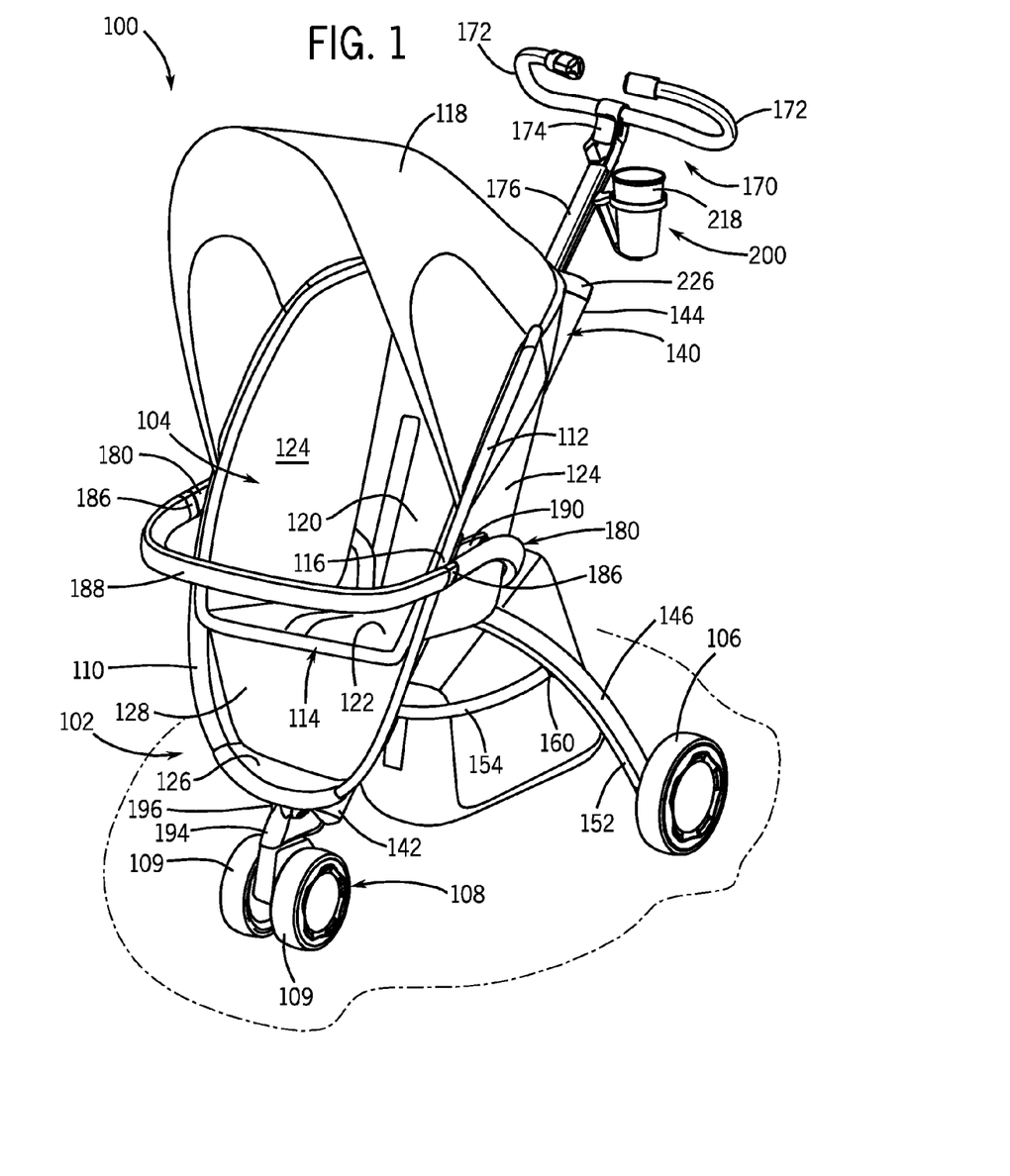
FIG. 1 shows a perspective view of one example of a stroller assembly with a cup holder assembly constructed in accordance with the teachings of the present invention.
Figure 2:
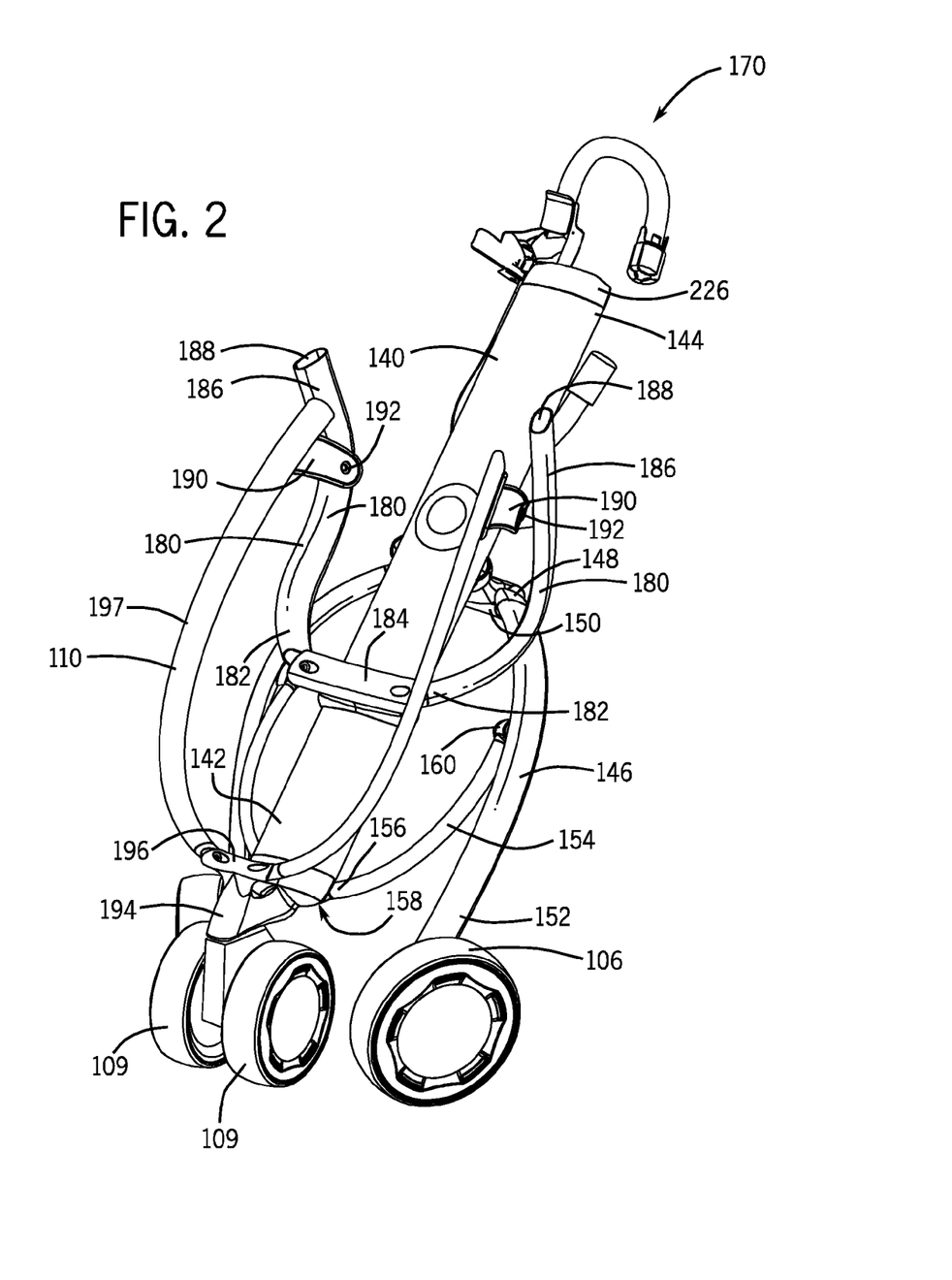
FIG. 2 shows the stroller assembly of FIG. 1, minus the seat assembly, in a collapsed or folded configuration.

Turning now to the drawings, a stroller 100 is depicted in FIGS. 1 and 2 and is constructed in accordance with the teachings of the present invention. In the disclosed example, the stroller 100 generally has a frame assembly 102, a seat assembly 104 supported by the frame assembly, and a plurality of wheels supporting the frame assembly on a ground surface. In general, the frame assembly 102 in the disclosed example includes a pair of rear wheels 106 and a single front wheel assembly 108 positioned forward of and at a mid point between the rear wheels. In this example, the front wheel assembly has two wheels 109 spaced apart side by side.

The frame assembly 102 in this example generally has a seat mounting frame 110 that is a U-shaped component. In the disclosed example, the seat assembly 104 can be removed from the seat frame 110 and the stroller 100. In general, the removable seat assembly 104 includes a pair of seat attachment tubes 112 positioned on opposite sides of an occupant seat 114. The seat tubes 112 are connected to and can be removed from upper ends 116 of the seat frame 110. The seat 114 of the seat assembly 104 is supported on the stroller at least in part by the seat tubes 112 and has a canopy 118 connected to an upper part of the seat. The seat 114 also has a seat back 120, a seat bottom 122, and seat side wings 124 positioned on opposite sides of the seat back and the seat bottom.

A footrest 126 is positioned at the bottom of the seat assembly 104 and is suspended from the front edge of the seat bottom 122 by a mesh fabric panel 128 in this example. The footrest 126 is also connected to the lower part of the seat frame 110. In the disclosed example, the seat 104 can be made entirely of fabric or like materials and be suspended from the seat tubes 112 and the seat frame 110, when attached. Alternatively, portions of the seat assembly 104 can have a removable cover placed over a generally rigid supporting structure that defines and shapes at least part of the seat, such as the seat bottom 122 and parts of the seat side wings 124. Thus, once attached to the seat frame 10, the seat assembly 104 can be sufficiently supported on the stroller and substantial enough to support the weight of a child occupant. As will be evident to those having ordinary skill in the art, the configuration and construction of the seat assembly 104 and the seat 114 can vary considerably and yet fall within the spirit and scope of the present invention.

The stroller frame assembly 102 in the disclosed example generally has a central spine 140 with a lower end 142 positioned near the front wheel assembly 108. The spine 140 also has an upper end 144 positioned behind the seat back 120 of the seat assembly 114 and between the rear wheels 106. A pair of curved rear legs 146 extends downward in opposite directions from an underside of the spine 140. Each leg 146 is bowed outward and extends in a rearward and downward direction. A proximal or top end 148 of each leg is coupled to a rear leg connector 150 positioned on the underside of the spine 140. The connector 150 is positioned in this example about mid-point between the upper end 144 and the lower end 142 of the spine 140. A distal or lower end 152 of each rear leg 146 in this example carries one of the rear wheels 106.

A rear leg link 154 is positioned on each side of the frame assembly 102 and links each rear leg 146 to the spine 40. Each link 154 has one end 156 coupled to a connector 158 on the underside of the spine 140 positioned below the rear leg connector along the spine. Each link 154 also has another end 160 coupled to a corresponding one of the rear legs 146. The links 154 provide stability for the stroller frame assembly 102, and particularly for the rear legs 146, during use.

The frame assembly 102 in the disclosed example also has a stroller handle 170 for pushing and maneuvering the stroller 100. The disclosed handle 170 generally has an upward facing, open C-shape that forms two handle sections 172. The two sections 172 extend in opposite directions from a handle bracket 174. The handle bracket 174 is coupled to a stanchion 176 that extends from the upper end 144 of the frame spine 140. In the disclosed example, the stanchion 176 is essentially a linear structure and extends parallel to and is aligned with the spine 140, which is also a generally linear structure.

The stroller 100 disclosed herein also has a pair of curved seat frame support arms 180. The support arms 180 extend upward in opposite directions from the top side of the spine 140. Each support arm 180 is bowed outward and extends in a forward and upward direction relative to the spine 140. A proximal or bottom end of each support arm 180 is coupled to a support arm connector (not shown) positioned on the top side of the spine 140. The support arm connector in this example is positioned at about the same location along the spine as the rear leg connector, which is on the underside of the spine. A distal end portion 186 of each support arm 180 is bent downward, extends generally horizontally forward, and terminates at an exposed end or face. An arm bar 188 is attached to the exposed ends of the support arms 180 in this example.

In this example, a seat frame link 190 is positioned on each side of the seat frame 110 and extends in a rearward direction. Each seat link 190 has a free end that is coupled to one of the support arms 180. The connection point between each seat link 190 and the respective support arm 180 in this example is spaced rearward from the exposed end of the support arms 180 along the distal end portion 186.

Also in the disclosed example, a frame bracket 194 is located at the lower front portion of the frame assembly 102.

The frame bracket 194 is connected to the lower most portion 196 of the seat frame 110 and to the lower end 142 of the spine 140. The front wheel assembly 108 is mounted to and extends downward from the frame bracket 194. The frame bracket 194 links the spine 140 to the seat frame 110 and provides the front wheel mounting location in the disclosed example.

The spine 140 is oriented centrally between the rear wheels 106 and defines a central or longitudinal axis of the stroller 100. In the disclosed example as shown in FIG. 1, the spine 140 is oriented at an angle with a low point at its lower end 142 and a high point at its upper end 144. The spine is oriented to position the handle 170 so that a caregiver can stand behind the stroller and push the stroller in a conventional manner by the handle 170. The seat assembly 104 is positioned above and forward of the spine 140 and faces forward relative to the stroller 100 away from the handle 170. However, the arrangement of the seat and frame components disclosed herein can vary and yet fall within the spirit and scope of the present invention. Additionally, the shape, size, configuration, orientation, and location of the various frame assembly and seat assembly components can also vary from the example shown without departing from the spirit and scope of the present invention.

In one example, the above stroller construction can be formed as a fixed structure that is not intended to be collapsed or folded. Such a stroller configuration would still provide a generally lightweight, easy to maneuver configuration. The stroller would be simpler in construction than an ordinary box-type frame stroller configuration and require fewer components to create the structure. The example of the stroller 100 disclosed herein can also be collapsible, as shown in FIG. 2 (minus the seat assembly 104), and in this case is collapsible in three dimensions. The folding of the stroller 100 is not discussed in any detail herein. However, the stroller frame folding arrangement and configuration is described and shown in detail in related U.S. application Ser. No. 11/696, 181 entitled "Stroller Frame" and which is assigned to the assignee of the present patent.

Figures 3, 4:
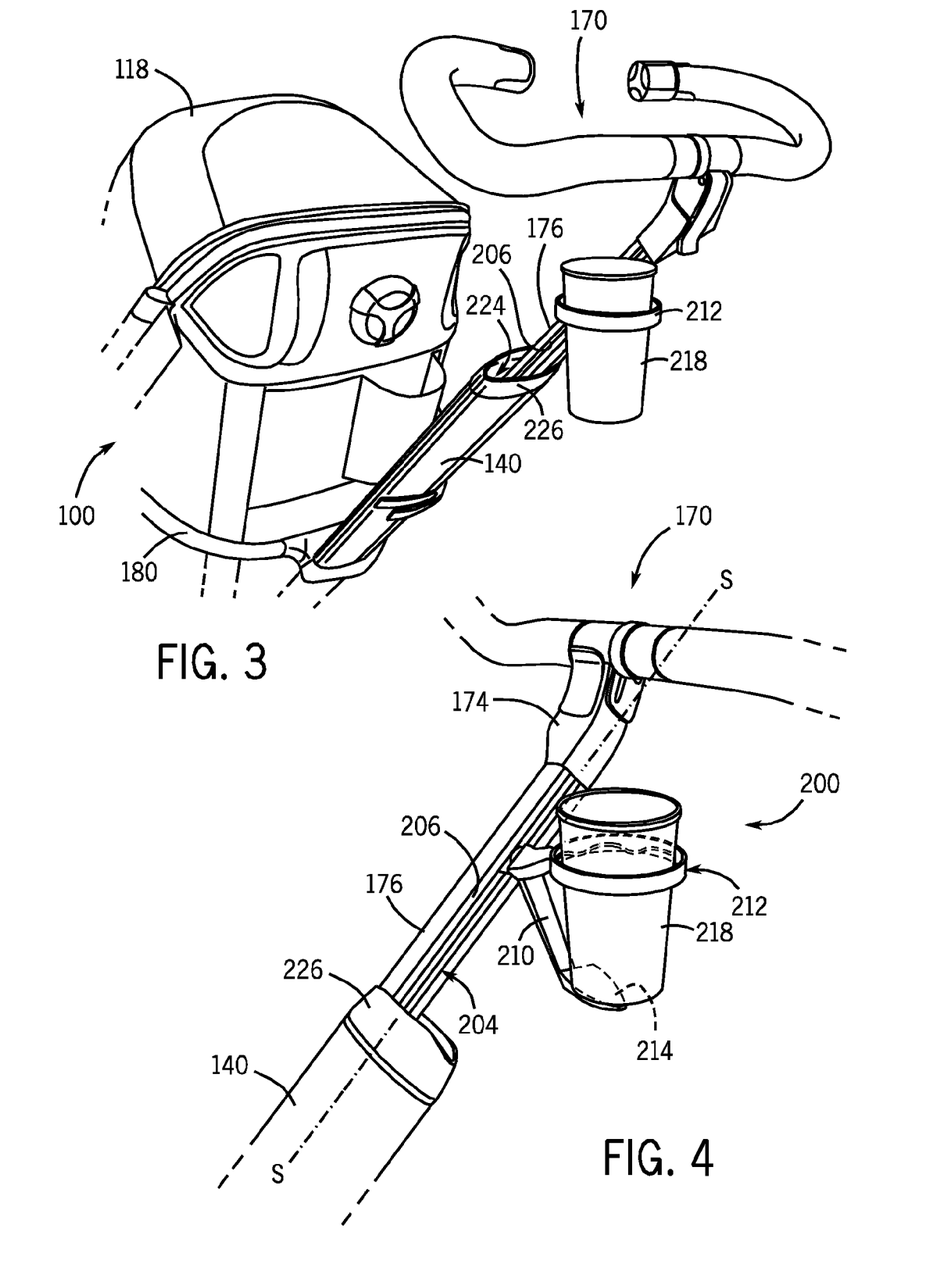
FIG. 3 shows a rear perspective view of the stroller and cup holder assembly shown in FIG. 1 with the cup holder assembly deployed and holding a cup.
FIG. 4 shows an enlarged front perspective view of the deployed cup holder assembly and cup of FIG. 3.

In accordance with the teachings of the present invention, a cup holder assembly 200 is illustrated generally in FIGS. 1, 3, 4. The disclosed cup holder assembly 200 can be deployed as shown in FIGS. 1, 3, and 4 and can be reconfigured to be stowed within the interior of the spine 140 as discussed below. In one example, the cup holder assembly 200 can be stowed or deployed independent of any other movement on the stroller, including folding or setting up of the stroller. In another example, movement of the cup holder assembly 200 can be tied to movement of the stanchion 176 so that the cup holder stows or deploys automatically upon collapsing of the stroller (FIG. 2) or setting up the stroller (FIG. 1). In the disclosed example, the cup holder assembly 200 is reconfigurable independent of the stroller frame motion.

Figure 5:
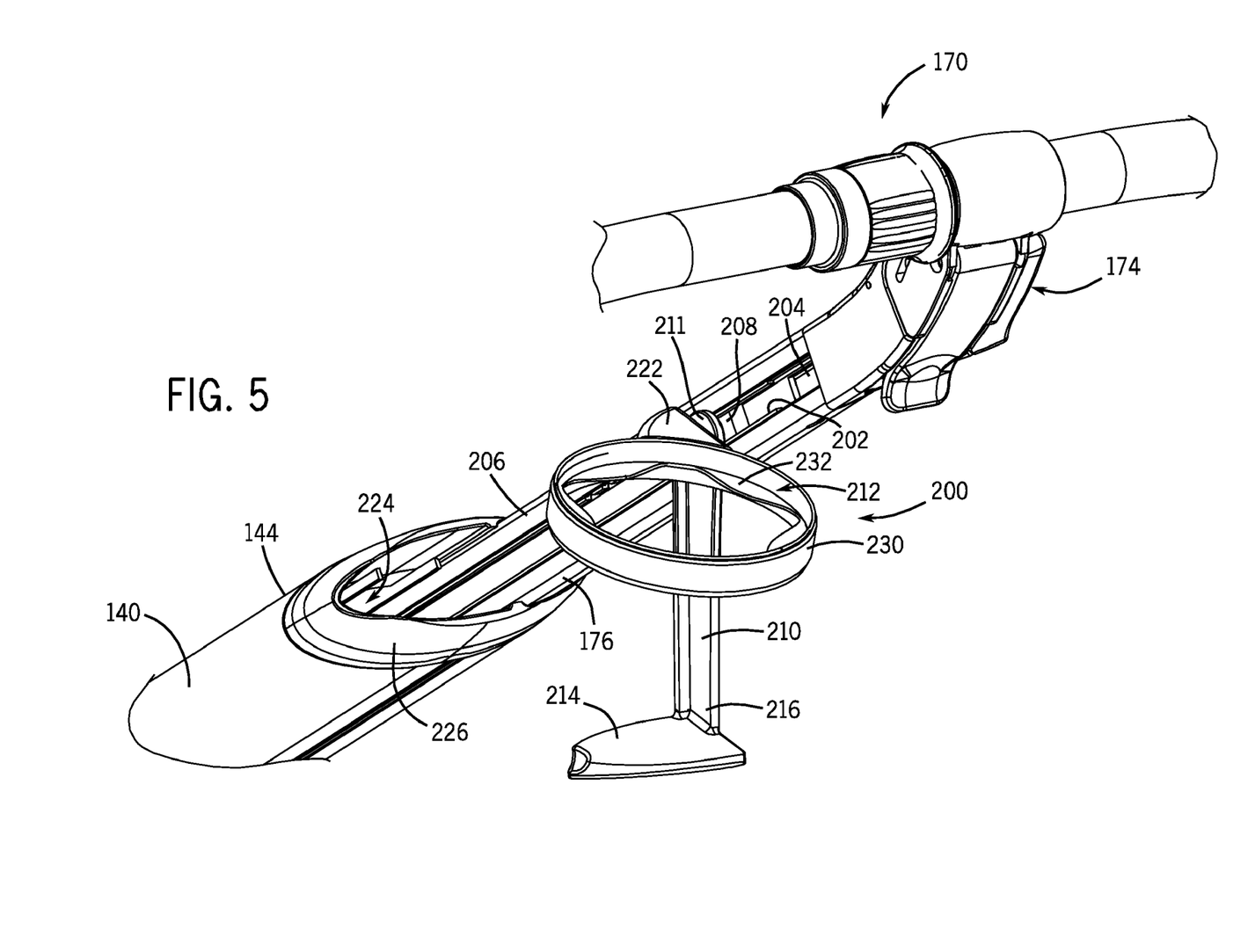
FIG. 5 shows an enlarged rear perspective view of the stroller frame and the cup holder assembly with no cup in the holder.

As shown in FIGS. 3-5, the cup holder assembly 200 independently slidable within a track 202 carried in a channel 204 in a side surface 206 of the stanchion 176. The cup holder assembly 200 includes a slider 208 that is configured to fit within and slide along the track 202 parallel to the axis S of the stanchion. The track 202 is configured to retain the slider 208 and prevent it from being removed from the channel 204 in a direction perpendicular to the stanchion axis S.

The cup holder assembly 200 in the present example generally has a support arm 210 with one end 211 rotationally or pivotally connected to the slider 208. The cup holder assembly 200 also has a cup receiver or ring 212 also pivotally coupled to the slider 208. In the disclosed example, the arm 210 when deployed extends generally vertically downward from the slider 208. The ring 212 is a circular cylinder in this example. A cup support or foot 214 extends in cantilevered fashion from the free end 216 of the arm 210. The foot 214 is oriented generally perpendicular to the arm 10 in this example. As shown in FIGS. 1, 3, and 4, a cup 218 can be placed through an opening 220 in the cup receiving ring 212 when the assembly 200 is deployed. The bottom of the cup 218 rests on the foot 214 and the ring 212 retains the cup in place on the foot.

Figures 6, 7:
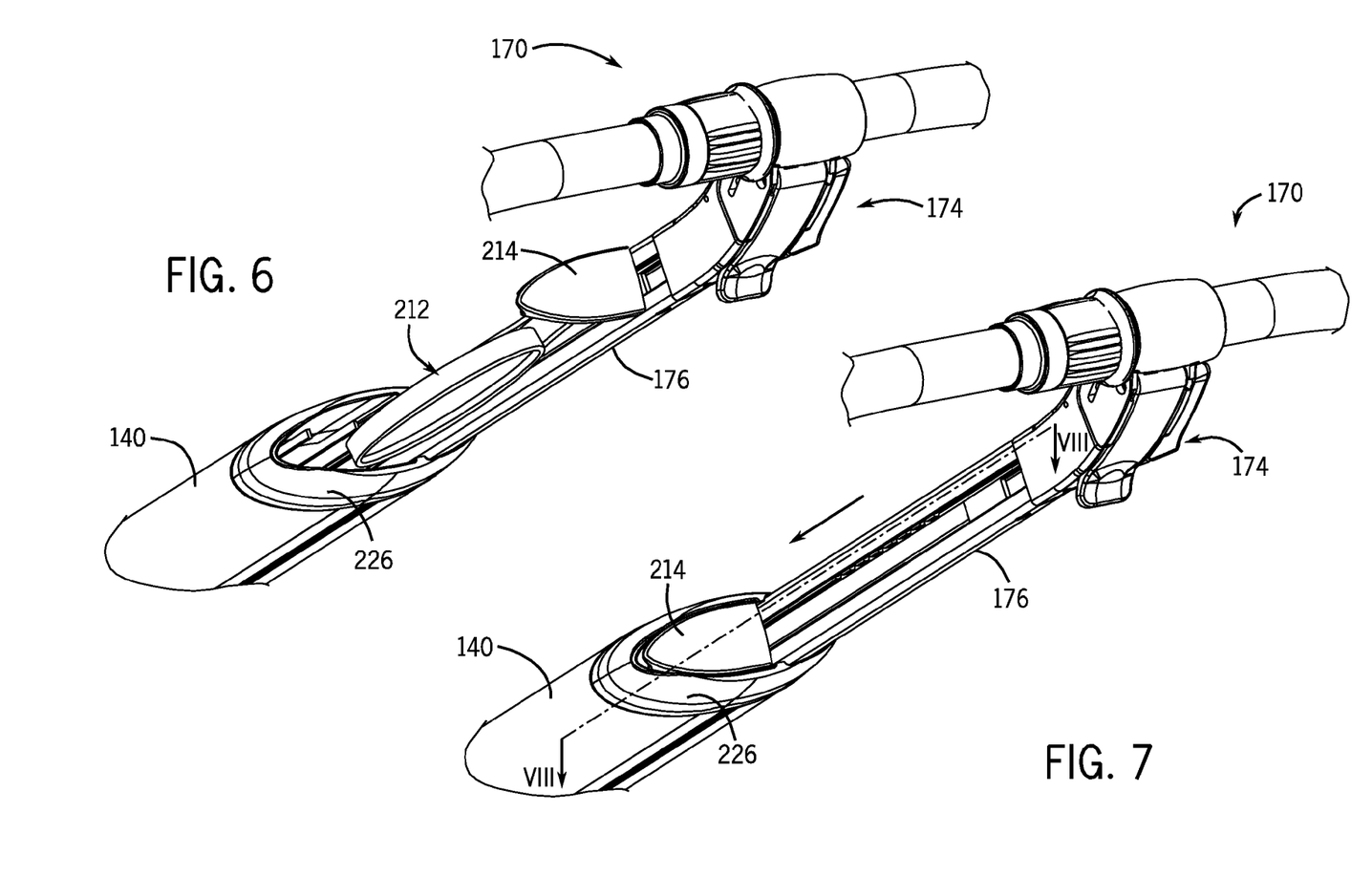
FIG. 6 shows the cup holder assembly of FIG. 5 folded and ready to be stowed.
FIG. 7 shows the cup holder assembly of FIG. 6 fully stowed in an end of the spine of the stroller shown in FIG. 1.

FIGS. 5-8 illustrate the procedure to move the cup holder assembly 200 from being deployed to being stowed. In this example, the cup holder ring 212 has an integral connector 222 projecting from one side. The coupler 222 is also pivotally connected to the slider 208 in the disclosed example. The upper end 211 of the arm 210 is sandwiched between the coupler 222 and the slider 208. The coupler 222 and the arm 210 can both rotate about an axis C that is perpendicular to the stanchion axis S and thus to the movement of the slider 208. The ring 212 and arm 210 can rotate about the axis C from their deployed orientations shown in FIG. 5 to a ready to be stowed orientation shown in FIG. 6. In the ready to be stowed orientation, the ring 212 rotates to a position such that a plane of the ring is generally parallel to the channel 204 and the stanchion 176 and its axis S. The arm 210 rotates rearward from the vertical deployed position of FIG. 5 and upward toward the handle 170 until the arm is also parallel to the stanchion axis S as shown in FIG. 6. The cup holder assembly is now ready to be stowed in the orientation of FIG. 6

With that in mind, FIGS. 3, 5, 6, and 8 show that the spine 140 is an oval hollow tube in the disclosed example. The stanchion 176 can be telescopically received in the upper end 144 of the spine 140. In this example, the stanchion is offset to one side of the oval spine tube. The space opposite the stanchion in the spine 140 is open and accessible through an open end 224 in the spine.

Figure 8:
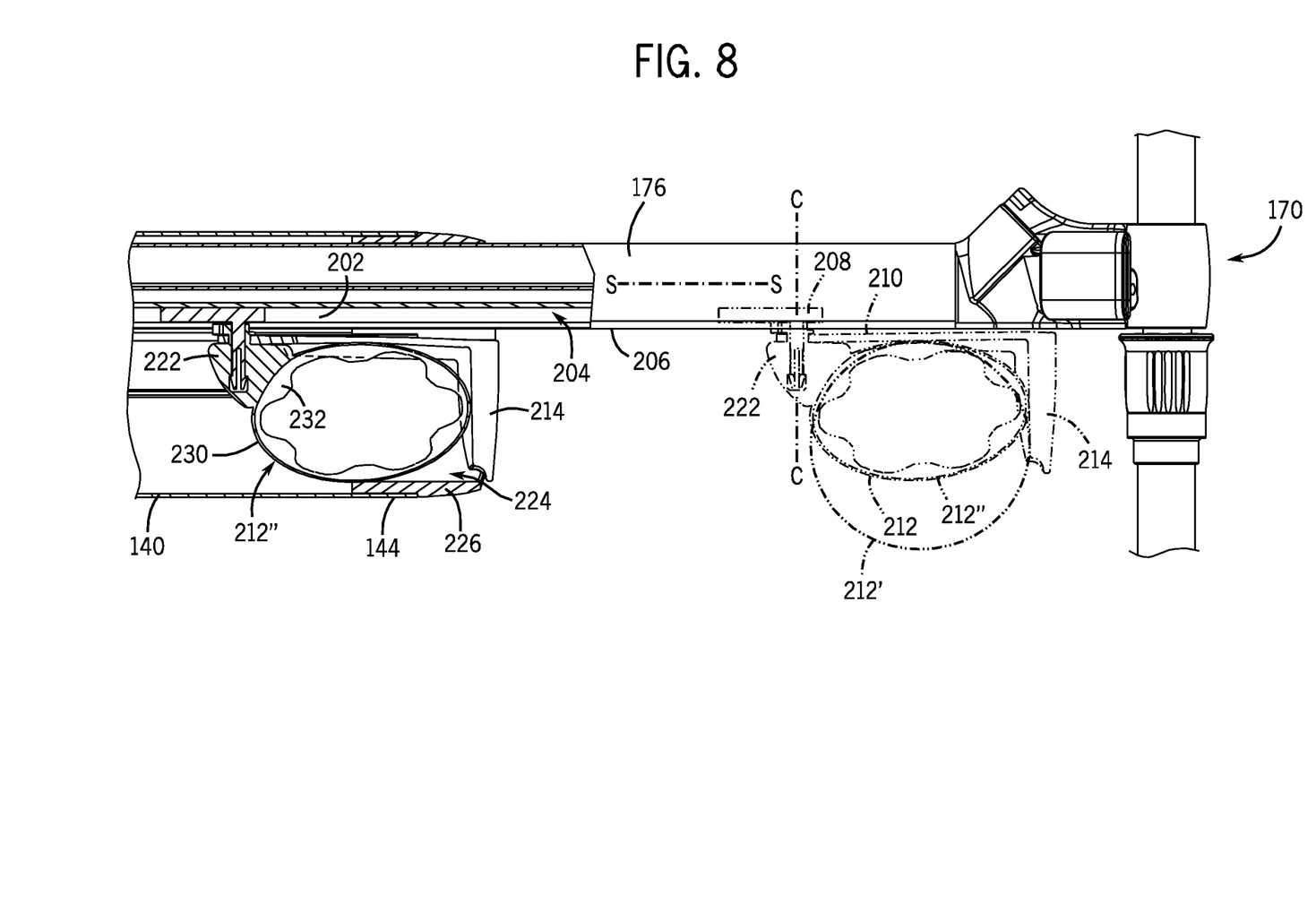
FIG. 8 shows a cross section taken along line VIII-VIII in FIG. 7 of the stowed cup holder and shows the ready to be stowed cup holder of FIG. 6 in phantom view.

To stow the cup holder assembly 200, the slider 208 facilitates sliding the ready to be stowed assembly of FIG. 6 down the stanchion 176 along the track 202. As shown in FIGS. 7 and 8, the cup holder assembly 200 in this example can be stowed completely within the open end 224 of the spine 140. In the disclosed example, a decorative cap or bezel 226 is attached to the upper end 144 of the spine 140. The bezel 226 surrounds the open end 224 of the spine. The bezel 226 can be configured to provide a receptacle 228 to mate with the foot 214 so that the foot acts as a closure device for the open end as shown. If desired, the foot 214 can also be designed in conjunction with the bezel 226 to snap into place in the bezel receptacle 228. This can help retain the cup holder assembly in the stowed position of FIG. 7.

As shown in FIG. 8, the ring can be formed of resilient flexible material. As shown, the diameter of the ring is larger than the width of the available interior space in the spine. Thus, the ring 212 can be collapsed in-plane from its normal circular shape 212 to an oval shape 212" as shown in phantom in FIG. 8. In one example, the ring 212 can be formed as one integral component. In an alternate example as disclosed, the ring 212 can be provided of a two-piece construction of two different materials. An annular ring portion 230 and an inner gripping portion 232 can be fabricated from two separate materials as two separate components and adhered to one another or can be co-molded from two materials simultaneously. As shown in FIGS. 5 and 8, the annular ring part 230 of the ring 212 can be a flexible but semi-rigid component that includes the integral coupler 222. The inner gripping component 232 can be a softer material that is more flexible and/or has a tacky, friction enhancing surface. The gripping part 232 can have an irregular shape as shown on the interior circumference of the annular ring 230. The inward protruding material can assist in retaining a cup 218 within the cup holder assembly 200 during use.

A simple coupler and arm connection is illustrated in FIG. 8. The slider 208 in this example has a pivot pin 234 protruding out from the track 202. the upper end 211 of the arm 210 can have a through hole 236 that slips or snaps over a larger diameter head 238 on the pin 234. A blind bore 240 can be formed in the coupler 222. Once the arm 210 is installed on the pin 234, the coupler 222 can be snapped in place over the pin 234. The head 238 and the bore 240 can be configured to provide a detent or some other retention arrangement to retain the coupler 222 on the pin. Both the coupler 222 and arm 210 are free to rotate around the pin axis C between the deployed and stowed orientations. Rotational stops or travel limiters can be added to the structures to assist in properly positioning the coupler 222 and the arm 210 in both rotational positions if desired.

To deploy the cup holder assembly 200 from the stowed position in FIGS. 7 and 8, the user need only release the foot 214 from the bezel 226 and then pull the arm 210 from the opening in the spine 140. The user can them simply rotate the arm 210 and the ring 212 to their deployed orientations for use. Again, linear travel limiters or stops can be employed in the track so as to properly locate the assembly 200 when slid from the spine to the deployed location along the stanchion track 202. In an alternative example, a torsion spring or other type of biasing element can be employed on or near the pivot pin 234. Both the coupler 222 and the support arm 210 can be spring biased by such a spring to their deployed orientations. The components can be biased automatically deploy upon moving the cup holder assembly 200 from the open end 224 of the spine. In a further example, for the collapsible version of the stroller (see FIG. 2), the cup holder can be tied to stanchion movement and be slid from the spine as the stanchion is extended from the spine. Similarly, the holder assembly 200 can be tied to movement of the stanchion 176 so that the assembly 200 automatically moves to the ready to be stowed condition and then slides into the open end 224 as the stanchion is slid into the spine during folding of the stroller 100.

Although certain cup holders for strollers have been disclosed and described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A cup holder assembly for a stroller having a frame with a first part and a second part near the first part, the cup holder assembly comprising:

a slider carried on and slidable along the second part of the stroller frame between a stowed position and a deployed position;

a cup receiving ring carried on the slider and movable between a stowed orientation and a deployed orientation; and a support arm carried on the slider and having a cup support foot extending from one end, the support arm movable between a stowed orientation and a deployed orientation, the foot extending beneath the cup receiving ring in the respective deployed orientations, wherein the first part of the frame is a tube with an open end, and, when the cup receiving ring and the support arm are in the respective stowed orientations and the slider is slid to the stowed position, the cup holder assembly is housed within a space inside the tube.

2. A cup holder assembly according to claim 1, wherein the slider is slidable along a track in the second part of the stroller frame.

3. A cup holder assembly according to claim 1, wherein the cup receiving ring is flexible and can be deformed to stow in the space in the first part of the stroller frame.

4. A cup holder assembly according to claim 1, wherein the cup receiving ring is rotatable about a rotation axis that is generally perpendicular to a sliding direction of the slider to move between its stowed and deployed orientations.

5. A cup holder assembly according to claim 4, wherein the support arm is rotatable about the rotation axis to move between its stowed and deployed orientations.

6. A cup holder assembly according to claim 1, wherein the support arm has an opposite end coupled to the slider and is rotatable about a rotation axis that is generally perpendicular to a sliding direction of the slider to move between its stowed and deployed orientations.

7. A cup holder assembly according to claim 6, wherein the support arm lies parallel to the sliding direction of the slider in its stowed orientation.

8. A cup holder assembly according to claim 1, wherein the support arm moves from the deployed orientation such that the foot covers the open end of the tube in the stowed orientation.

9. A cup holder assembly according to claim 8, wherein the slider is slidable along a track in a frame part of the stroller with the support arm oriented parallel to a sliding direction of slider.

10. A cup holder assembly for a stroller having a frame, The cup holder assembly comprising:
    a slider carried on and slidable in a sliding direction along a track in a frame part of the stroller frame between a stowed position and a deployed position;
    a cup receiving ring carried on the slider and movable between a stowed orientation and a deployed orientation; and
    a support aim carried on the slider and having a cup support foot extending from one end, the support arm movable between a stowed orientation and a deployed orientation, the slider being slidable with the support arm oriented parallel to the sliding direction, and the foot extending beneath the cup receiving ring in the respective deployed orientations,
    wherein when the cup receiving ring and the support ant are in the respective stowed orientations and the slider is in the stowed position the cup holder assembly is housed within a space in an open end of a frame tube of the stroller frame, wherein a bezel is received over the open end of the frame tube, and wherein the foot seats in and mates with an opening in the bezel in the stowed position.

11. A cup holder assembly according to claim 1, wherein the cup holder assembly is hidden from view within the tube when in the stowed position.

12. A stroller assembly comprising:
    a first frame part with a hollow interior and an opening into the hollow interior;
    a second frame part adjacent the opening to the hollow interior and selectively positionable within or outside of the hollow interior of the first frame part;
    a slider carried on and slidable along the second frame part between a deployed position and a stowed position;
    a cup receiving ring carried on the slider and movable between a stowed orientation and a deployed orientation; and
    a support arm carried on the slider and movable between a stowed orientation and a deployed orientation, wherein a part of the support arm underlies the cup receiving ring with the support arm and cup receiving ring in the respective deployed orientations, wherein when the slider is slid to the stowed position, the cup receiving ring and the support arm in the respective stowed orientations are received through the opening within the hollow interior of the first frame part, and
    wherein the slider can be in the stowed position and the cup receiving ring and the support arm can be in the stowed orientations within the hollow interior regardless of whether the second frame part is positioned within or outside the hollow interior of the first frame part.

13. A stroller assembly according to claim 12, wherein the slider is slidable along a track in the second frame part along a sliding direction.

14. A stroller assembly according to claim 12, wherein the cup receiving ring is flexible and can be deformed to fit into and stow in the hollow interior.

15. A stroller assembly according to claim 12, wherein the cup receiving ring and the support arm are rotatable about a rotation axis that is generally perpendicular to a sliding direction of the slider to move between stowed and deployed orientations.

16. A stroller assembly according to claim 12, wherein the underlying part of the support arm covers the opening into the hollow interior in the stowed position.

17. A stroller assembly comprising:
    a first frame part with a hollow interior and an open end into the hollow interior;
    a bezel received over the open end and having a bezel opening;
    a second frame part adjacent the open end to the hollow interior and positionable outside of the hollow interior of the first frame part;
    a slider carried on and slidable along the second frame part between a deployed position and a stowed position;
    a cup receiving ring carried on the slider and movable between a stowed orientation and a deployed orientation; and
    a support arm carried on the slider and movable between a stowed orientation and a deployed orientation, wherein a part of the support arm underlies the cup receiving ring with the support arm and cup receiving ring in the respective deployed orientations,
    wherein, when the slider is slid to the stowed position, the underlying part seats in and mates with the bezel opening in the bezel, and wherein the cup receiving ring and the support arm in the respective stowed orientations are received through the bezel opening within the hollow interior of the first frame part.

18. A stroller comprising:
    a stroller frame tube with an open end; and
    a cup holder assembly having
        a slider carried on and slidable along a part of the stroller frame between a stowed position and a deployed position,
        a cup receiving ring carried on the slider and movable between a stowed orientation and a deployed orientation, and
        a support arm pivotally coupled at one end to the slider and having a cup support extending from an opposite end of the support arm, the support arm movable between a stowed orientation and a deployed orientation, the cup support spaced from and extending beneath the cup receiving ring in the respective deployed orientations,
wherein the cup receiving ring and the support arm are moved into the open end to the respective stowed orientations and the slider is slid to the stowed position, and wherein the support arm and cup receiving ring are hidden and housed within a space in the stroller frame tube.

* * * * *

UNITED STATES PATENT AND TRADEMARK OFFICE
CERTIFICATE OF CORRECTION

PATENT NO. : 7,543,841 B2  Page 1 of 1
APPLICATION NO. : 11/696165
DATED : June 9, 2009
INVENTOR(S) : Michael A. Dotsey et al.

It is certified that error appears in the above-identified patent and that said Letters Patent is hereby corrected as shown below:

In the claims:

Column 7 claim 10, line 45, please delete "ant" and replace with -- arm --

Signed and Sealed this

Eleventh Day of August, 2009

David J. Kappos
*Director of the United States Patent and Trademark Office*